US011937038B2

(12) United States Patent
Kulavik et al.

(10) Patent No.: US 11,937,038 B2
(45) Date of Patent: *Mar. 19, 2024

(54) EARPHONES WITH MOTION SENSITIVE INFLATION

(71) Applicant: Voyetra Turtle Beach, Inc., White Plains, NY (US)

(72) Inventors: Richard Kulavik, San Jose, CA (US); Christopher Church, San Jose, CA (US)

(73) Assignee: VOYETRA TURTLE BEACH, INC, White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,805

(22) Filed: Jan. 11, 2022

(65) Prior Publication Data

US 2022/0210536 A1 Jun. 30, 2022

Related U.S. Application Data

(63) Continuation of application No. 16/258,997, filed on Jan. 28, 2019, now Pat. No. 11,223,893, which is a (Continued)

(51) Int. Cl.

*H04R 25/00* (2006.01)
*H04R 1/10* (2006.01)
*H04R 29/00* (2006.01)

(52) U.S. Cl.

CPC ......... *H04R 1/1041* (2013.01); *H04R 1/1016* (2013.01); *H04R 1/1008* (2013.01); (Continued)

(58) Field of Classification Search

CPC .. H04R 1/1016; H04R 1/1041; H04R 1/1008; H04R 1/1083; H04R 25/656; H04R 29/00 (Continued)

(56) References Cited

U.S. PATENT DOCUMENTS 6,094,494 A 7/2000 Haroldson
8,526,651 B2 9/2013 Lafort et al.
(Continued)

FOREIGN PATENT DOCUMENTS

EP 2040490 11/2012
WO 2012076061 6/2012

*Primary Examiner* — Phylesha Dabney

(74) *Attorney, Agent, or Firm* — McAndrews, Held & Malloy, Ltd.

(57) ABSTRACT

Methods and systems are provided for earphones with motion sensitive inflation. Information may be obtained relating to a user of an audio output element that outputs audio signals, with at least portion of the audio output element being in contact with the user. One or both of outputting of the audio signals and the contact between the audio output element and the user may be assessed based on the obtained information. Based on the assessing, one or more adjustments applicable to the audio output element may be determined, with at least one adjustment applying to positioning of the at least portion of the audio output element. The determining includes configuring the at least one adjustment to account for and/or counteract effects of (Continued)

the positioning on one or both of outputting of the audio signals and the contact between the audio output element and the user.

20 Claims, 4 Drawing Sheets

Related U.S. Application Data continuation of application No. 14/827,309, filed on Aug. 15, 2015, now Pat. No. 10,194,230.

(60) Provisional application No. 62/037,847, filed on Aug. 15, 2014.

(52) U.S. Cl.
CPC .......... *H04R 1/1083* (2013.01); *H04R 25/656* (2013.01); *H04R 29/00* (2013.01)

(58) Field of Classification Search
USPC .......................................................... 381/380
See application file for complete search history.

(56) References Cited

U.S. PATENT DOCUMENTS

| | | | | |
|---|---|---|---|---|
| 8,548,181 | B2 | 10/2013 | Kraemer | |
| 9,307,331 | B2 | 4/2016 | Pedersen | |
| 2006/0098833 | A1 | 5/2006 | Juneau et al. | |
| 2009/0069645 | A1 | 3/2009 | Nielsen et al. | |
| 2009/0245530 | A1 | 10/2009 | Keady | |
| 2010/0111340 | A1 | 5/2010 | Miller et al. | |
| 2010/0322454 | A1 | 12/2010 | Ambrose et al. | |
| 2013/0101147 | A1 | 4/2013 | Kraemer | |
| 2013/0136285 | A1 | 5/2013 | Naumann | |
| 2013/0202141 | A1 | 8/2013 | Basseas | |
| 2013/0251172 | A1 | 9/2013 | Mosseri | |
| 2014/0119585 | A1 | 5/2014 | van Hal | |
| 2014/0146989 | A1 * | 5/2014 | Goldstein | H04R 1/1016 381/380 |
| 2016/0008176 | A1 | 1/2016 | Goldstein | |
| 2016/0015568 | A1 | 1/2016 | Keady | |
| 2016/0050483 | A1 | 2/2016 | Kulavik et al. | |
| 2017/0295269 | A1 | 10/2017 | Hosoi et al. | |

* cited by examiner

EARPHONES WITH MOTION SENSITIVE INFLATION

CLAIM OF PRIORITY

This patent application is a continuation of U.S. patent application Ser. No. 16/258,997, filed on Jan. 28, 2019, which is a continuation of U.S. patent application Ser. No. 14/827,309, filed on Aug. 15, 2015, which claims priority to and benefit from the U.S. Provisional Patent Application Ser. No. 62/037,847, filed on Aug. 15, 2014. Each of the above identified application is hereby incorporated herein by reference in its entirety.

TECHNICAL FIELD

Aspects of the present application relate to audio systems. More specifically, to methods and systems for earphones with motion sensitive inflation.

BACKGROUND

Limitations and disadvantages of conventional approaches to audio output devices, particularly earphones, will become apparent to one of skill in the art, through comparison of such approaches with some aspects of the present method and system set forth in the remainder of this disclosure with reference to the drawings.

BRIEF SUMMARY

Methods and systems are provided for earphones with motion sensitive inflation, substantially as illustrated by and/or described in connection with at least one of the figures, as set forth more completely in the claims.

DETAILED DESCRIPTION

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}.

In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1:
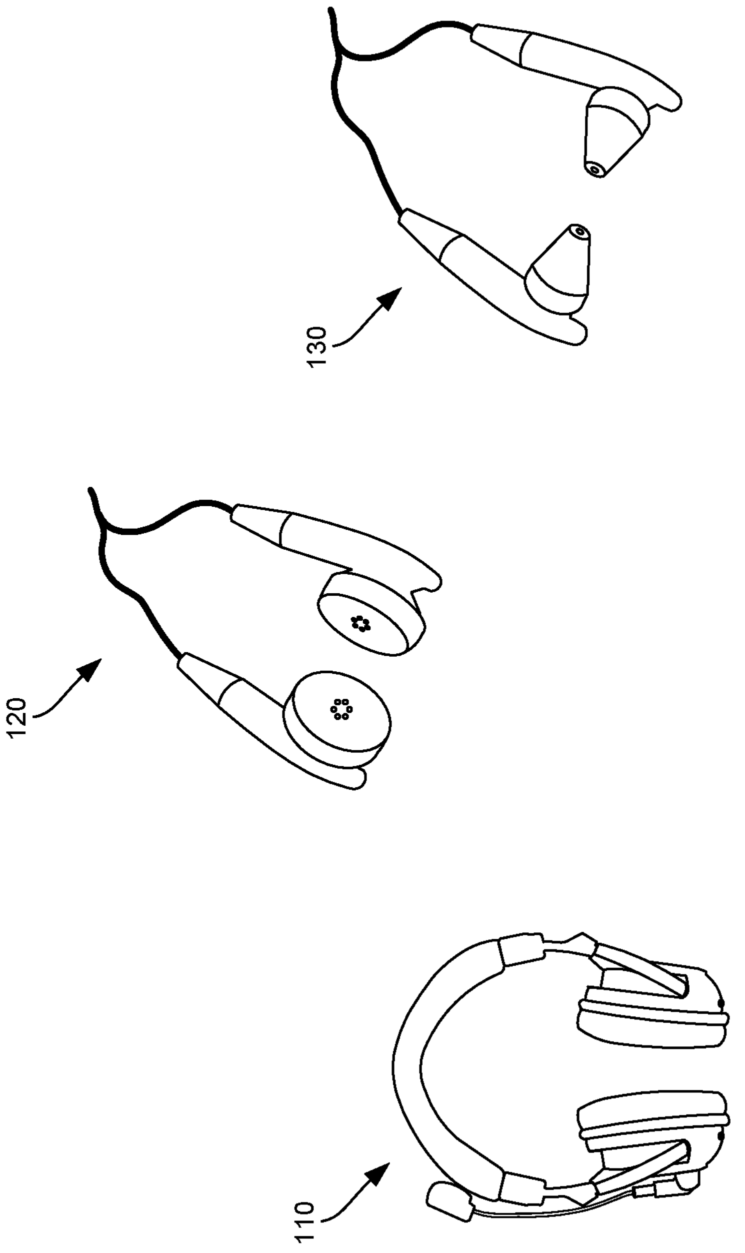
FIG. 1 illustrates various example earphones, which may be configured to implement various aspect of the present disclosure.

FIG. 1 illustrates various example earphones, which may be configured to implement various aspect of the present disclosure. Shown in FIG. 1 are various different example earphones 110, 120, and 130.

In this regard, "earphones" may comprise any suitable audio (or acoustic) output device which may be used in a manner by which audio (or acoustic) signals are outputted directly into users' ears. For example, earphones may comprise headphones (or headsets), such as headphone 110, in which the audio output components may rest on the users' ears (e.g., by incorporating circular or ellipsoid earpads that encompass the ears) or over the users' ears (e.g., by incorporating earpads that press against the ears). Earphones may also comprise ear-fitting headphones, in which the audio output components may rest directly against and/or within the users' ears. Examples of ear-fitting headphones may comprise earbuds, such as earbud 120, in which the audio output elements are fitted directly in the user's outer ear where they are facing but not inserted into the ear canals; and in-ear headphones, such as in-ear monitor 130, in which the audio output elements are inserted into the ear canals.

In some instances, the listening experience of the user when using earphones may be affected by, among various factors, the positioning of the earphones and the security of the earphones themselves against the user's ears. For example, in instances where the user may be moving (e.g., running, walking, etc.), the earphones may separate from the user's ears, and at the very least, the earphones may move even slightly creating a space between the earphone and the intended application area of the area. This may impact the listening experience. For example, such separation may expose the user's ears to ambient noise, which may interfere with the intended audio (or other acoustics) being outputted via the earphones.

Accordingly, in various implementations in accordance with the present disclosure, earphones (or any audio/acoustic outputting devices that may be operate by application of audio/acoustic signals directly into users' ears) may be configured to periodically or constantly adjust their positioning against the users' ears to guard against unintended or undesirable changes to that positioning. Securing and/or adjusting the positioning of the earphones may be determined based on, and/or may be intended to counteract, unintended or undesirable changes caused by the user's motion. In some example implementations, securing and/or adjusting the positioning of the earphones may be achieved by incorporating suitable means, such as inflatable elements. In this regard, the inflations of such inflatable elements may be dynamically and/or adaptively adjusted—e.g., based on movement of the user—to ensure optimal securing of the earphone onto or in the user's ears and/or an optimal seal between the earphone and the ears, thus minimizing effects of potential interference (e.g., ambient noise). An example implementation is described in more detail with respect to FIG. 2.

Figure 2:
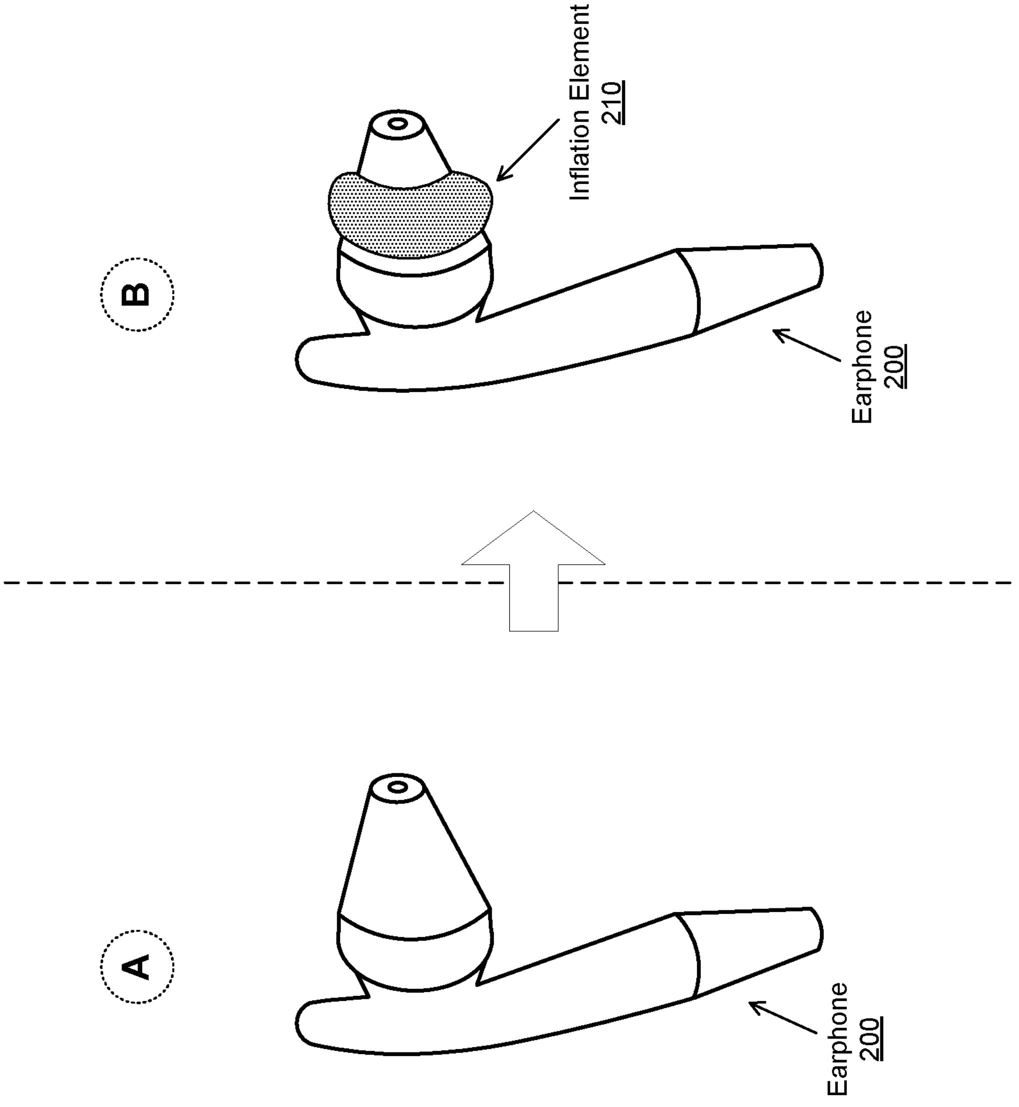
FIG. 2 illustrates an example use scenario of an earphone that is configured to support motion sensitive inflation, in accordance with the present disclosure.

FIG. 2 illustrates an example use scenario of an earphone that is configured to support motion sensitive inflation, in accordance with the present disclosure. Shown in FIG. 2 is an earphone 200.

The earphone 200 may be similar to any of the earphones shown in FIG. 1, for example. The earphone 200 may be configured to support motion sensitive inflation. For example, earphone 200 may comprise an inflation component 210, the inflation of which may be adaptively and/or dynamically controlled or adjusted based on, for example, movement of the user wearing the earphone 200. The inflation component 210 may comprise, for example, an air bladder which may inflate (as needed) to secure the earphone 200 into the user's ear (in which the earphone is inserted).

The inflation component 210 may be inflated in response to movement of the user (e.g., movement resulting from user walking or running). Further, in the inflation component 210 may be deflated in response to movement of the user. For example, the inflation component 210 may be inflated by a pump (not shown) or the like. In this regard, the pump may be configured to operate in response to movement of the user. Thus, when an increase in the movement of the user is detected or sensed, the pump may inflate the inflation component 210. The inflation component 210 may be deflated, such as by allowing air to slowly escape (e.g., through the pump or a release valve), in response to movement of the user—e.g., when there is reduction in the movement of the user.

Thus, the inflation of the inflation component 210 may be proportional to the amount of movement of the user (e.g., amount and/or type of movement). Adaptively adjusting the inflation in that manner—that is, based on the movement of the user—may be desirable because the likelihood of the earphones falling out increases with movement of the user. On the other hand, the pressure associated with increased inflation of the inflation component 210 may cause discomfort to the user over extended periods of time. Thus, when there is no (or little movement) and as such less likelihood of the earphones falling, deflating the inflation component 210 may relieve that discomfort.

In some instances, the inflation component 210 may be continually inflated, and the additional air may force out old air, thus keeping the earphone 200 and ear canal cool. Accordingly, the inflation component 210 may be configured to allow some air to escape even in inflated stated.

In some instances, the earphones may allow adjustment of the inflation based on other inputs beside the movement of the user. For the example, the earphone 200 (or any device coupled thereto) may also comprise a control (e.g., button) for manually pumping the inflation component 210 when not moving, and/or control (e.g., button or valve) for adjusting the degree of inflation (e.g., psi setting) of the inflation component 210—e.g., by controlling air leakage rate or bleeding off some air.

Figure 3:
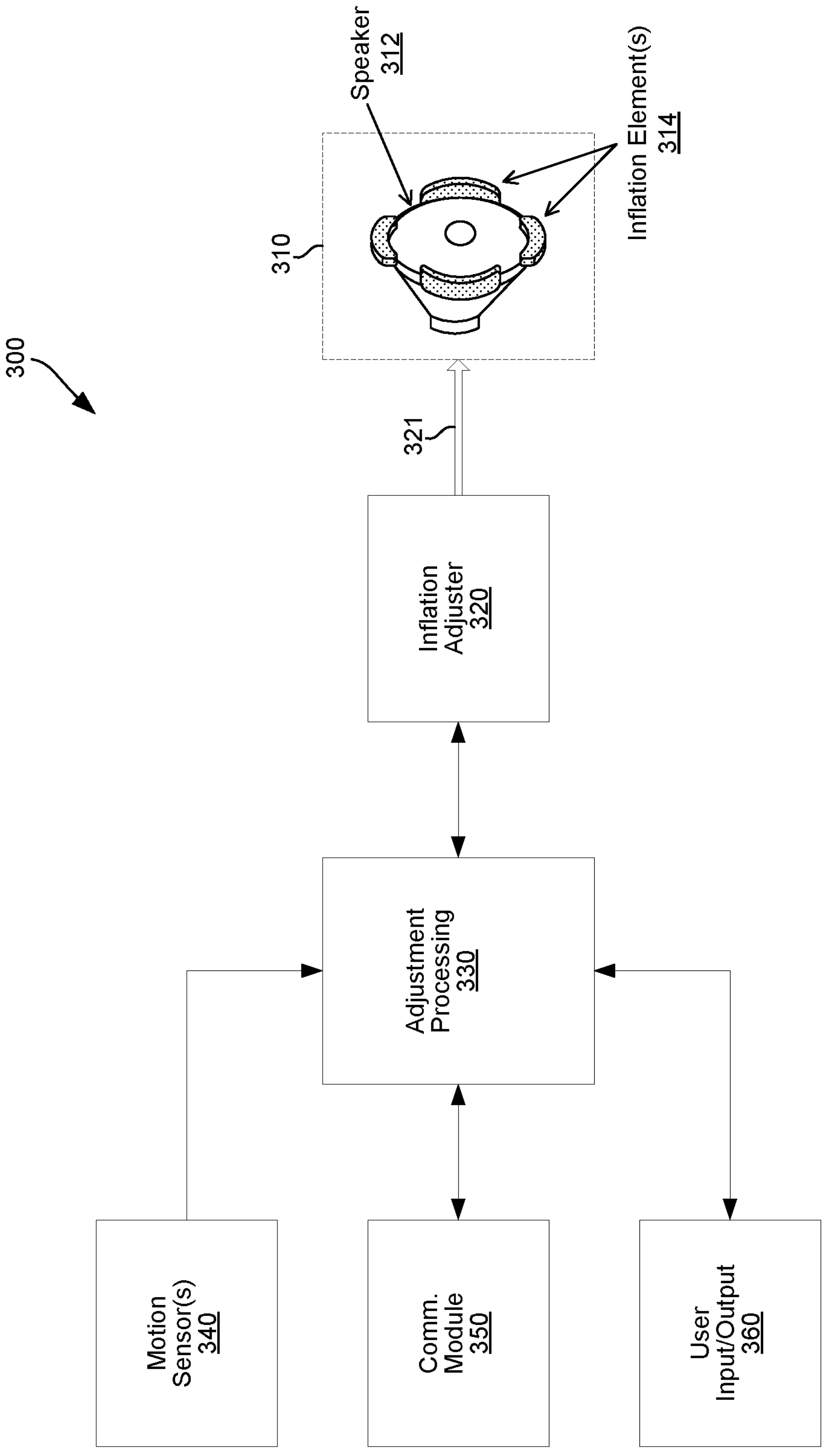
FIG. 3 illustrates an example system for supporting motion sensitive inflation in earphones, in accordance with the present disclosure.

FIG. 3 illustrates an example system for supporting motion sensitive inflation in earphones, in accordance with the present disclosure. Shown in FIG. 3 is system 300.

The system 300 may comprise an earphone 310 and suitable circuitry and/or other hardware, which may be configured for supporting motion sensitive inflation in the earphone 310. In this regard, the earphone 310 may comprise, for example, one or more inflation elements 314 attached to the speaker element 312 of the earphone 310. The one or more inflation element 314 may be used to ensure secured and/or sealed of the earphone 310 (or the speaker element 312 thereof) onto or in the user's ear.

For example, the system 300 may comprise, for example, an inflation adjuster 320, an adjustment processing block 330, one or more motion sensors 340, a communication module 350, and a user input/output (I/O) component 360.

The inflation adjuster 320 may be adapted to adjust the inflation of the one or more inflation elements. For example, the inflation adjuster 320 may comprise a pump, a valve, and/or corresponding suitable circuitry and/or hardware for inflating the one or more inflation elements 314, such as by generating air stream 321 that may be applied into them, and/or for deflating the one or more inflation element 314, such as by releasing some of the air already in the inflation elements 314.

The adjustment processing block 330 may comprise suitable circuitry for determining inflation adjustments. For example, the adjustment processing block 330 may determine when and/or how (amount) to adjust the inflation. In this regard, the adjustment processing block 330 may determine the proper adjustments (e.g., in terms of timing and/or degree) based on various inputs received from other components of the system 300—e.g., current inflation of the elements (obtained from the inflation adjuster 320), sensory information relating to the motion of the user (e.g., obtained from the motion sensors 340), and/or user preferences (e.g., obtained via the user I/O component 360).

The motion sensors 340 may comprise suitable circuitry and/or hardware for detecting motion (e.g., movement of the user wearing the earphone 310) and/or information relating to that motion (e.g., degree, type, etc.).

The motion sensors 340 may comprise, for example, a gyroscope, an accelerometer, and/or a compass suitable circuitry and/or hardware for detecting motion (e.g., movement of the user wearing the earphone 310) and/or information relating to that motion (e.g., degree, type, etc.). For example, the motion sensors 340 may comprise a gyroscope, an accelerometer, and/or a compass The communication module 350 comprise suitable circuitry and/or hardware for supporting communication (e.g., wired and/or wireless), particularly with respect to operations of the system 300.

The user I/O component 360 may comprise suitable circuitry and/or hardware for enable user interactions (input and/or output), particularly with respect to operations of the system 300. For example, the user I/O component 360 may enable user input and/or output relating to inflation (or adjustment thereof) of the inflation elements 314. The user I/O component 360 may support various types of input and/or output, including audible, graphical, textual, etc.

In some instances, all of the components of the system 300 may be incorporated into the earphone 310. Alternatively, in some instances, at least some of the components of the system 300 may be external to the earphone 310, being incorporated into a device coupled to the earphone 310 for example—e.g., the device providing the audio/acoustics being outputted via the earphone 310 (e.g., a device such as a smartphone, tablet device, music player, etc.). For example, in one embodiment, the earphone 310 may take advantage of motion sensor(s) (devices, MEMS, chips, circuitry, etc., implementing for example, a gyroscope, an accelerometer, and/or a compass) that exist in the device providing the audio/acoustics being outputted via the earphone 310. In this example embodiment, signals from the motion sensor(s) are communicated to the earphone 310 related to motion of the device providing the audio/acoustics being outputted via the earphone 310 (and thus related to the user).

Other components may also be located externally to the earphone 310 such as, for example, the inflation adjuster 320—thus, air being used to inflate the inflation elements 314 may be transported via suitable pipe, tube, or the like to the earphone 310.

While FIG. 3 depicts an electronically controlled inflation adjuster, in another implementation the pump may operate purely mechanically on the force generated by the movement of the wearer. For example, a piston in a vertical cylinder may be move up and down, pumping air into the inflation element(s) 310, in response to the wearer's strides.

Figure 4:
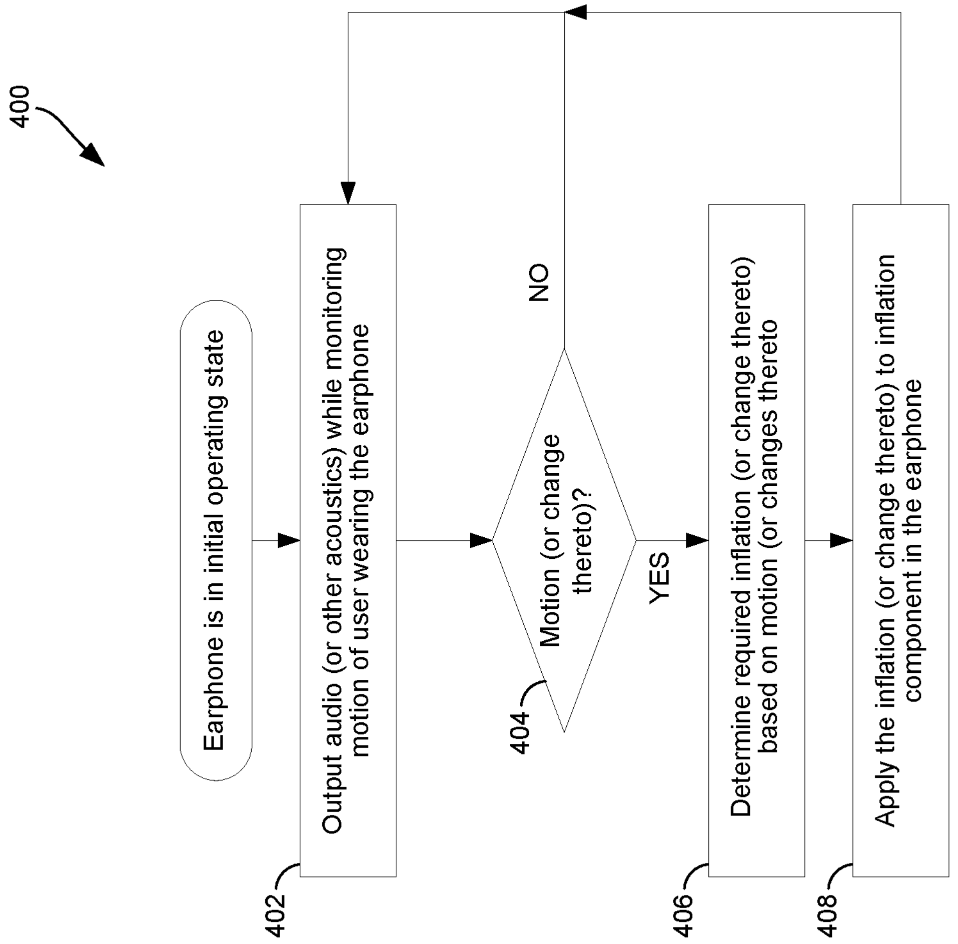
FIG. 4 is a flowchart illustrating an example process for providing motion sensitive inflation in earphones.

FIG. 4 is a flowchart illustrating an example process for providing motion sensitive inflation in earphones. Shown in FIG. 4 is a flow chart 400, comprising a plurality of example steps.

In step 402, audio (or other acoustics) is output while motion of user wearing the earphone is monitored.

In step 404, it may be determined if there has been movement (or change thereto) by the user of the earphone. In instances where there has been no movement (or change thereto), the process may loop back to step 402, to continue audio/acoustic output operations.

Returning to step 404, in instances where there has been movement (or change thereto), the process may proceed to step 406. In step 406, the required inflation (or change thereto) may be determined, such as based on motion (or changes thereto) or other factors (e.g., user preferences, current inflation, etc.).

In step 408, the inflation (or change thereto) as determined in the previous step may be applied to an inflation component in the earphone. The process may then loop back to step 402, to continue audio/acoustic output operations.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:

obtaining information relating to a user of an audio output element that outputs audio signals, wherein at least portion of the audio output element is in contact with the user;

assessing based on the obtained information, one or both of outputting of the audio signals and contact between the audio output element and the user;

determining based on the assessing, one or more adjustments applicable to the audio output element, wherein:

at least one adjustment applies to positioning of the at least portion of the audio output element relative to the user; and the determining comprises configuring the at least one adjustment to account for and/or counteract effects of the positioning of the at least portion of the audio output element on one or both of outputting of the audio signals and the contact between the audio output element and the user; and determining one or both of a timing for applying the at least one adjustment and an amount of the at least one adjustment based on one or more of current status of at least one component that affects the positioning of the at least portion of the audio output element, sensory information associated with the user, and user preferences.

2. The method of claim 1, wherein the assessing comprises assessing one or more of: ambient noise, and one or more characteristics associated with at least one component of the audio output element that is used in controlling the contact.

3. The method of claim 1, comprising applying at least one adjustment of the one or more adjustments in response to one or both of a particular trigger and a user input.

4. The method of claim 1, wherein applying at least one adjustment of the one or more adjustments comprises modifying one or more characteristics associated with one or more positioning components of or coupled to the audio output element.

5. The method of claim 4, comprising modifying at least one of the one or more characteristics of at least one of the one or more positioning components using force generated based on activities of the user.

6. The method of claim 4, wherein the one or more positioning components comprise at least one physically-adjustable component, and wherein the modifying of one or more characteristics comprises making at least one physical adjustment in the at least one physically-adjustable component.

7. The method of claim 6, wherein the at least one physically-adjustable component comprises an inflation element, and wherein the modifying of one or more characteristics comprises modifying inflation of the at least one inflation element to affect the contact with the user.

8. The method of claim 7, wherein modifying the inflation of the at least one element comprise adjusting one or more both of injection of a substance into and releasing of the substance from the at least one inflation element.

9. A system comprising:

an audio output element that is configured to output audio signals, wherein at least portion of the audio output element is in contact with a user;

at least one circuit that is configured to:

obtain information relating to the user;

assess, based on the obtained information, one or both of outputting of the audio signals and contact between the audio output element and the user; and determine, based on the assessing, one or more adjustments applicable to the audio output element, wherein:

at least one adjustment applies to positioning of the at least portion of the audio output element relative to the user; and the determining comprises configuring the at least one adjustment to account for and/or counteract effects of the positioning of the at least portion of the audio output element on one or both of outputting of the audio signals and the contact between the audio output element and the user; and determine one or both of a timing for applying the at least one adjustment and an amount of the at least one adjustment based on one or more of current status of at least one component that affects the positioning of the at least portion of the audio output element, sensory information associated with the user, and user preferences.

10. The system of claim 9, wherein the at least one circuit is configured to assess, based on the obtained information, one or more of: ambient noise, and one or more characteristics associated with at least one component of the audio output element that is used in controlling the contact.

11. The system of claim 9, wherein the at least one circuit is configured to apply at least one adjustment of the one or more adjustments in response to one or both of a particular trigger and a user input.

12. The system of claim 9, further comprising one or more positioning elements that are configurable to adjust the positioning of the at least portion of the audio output element, and wherein the at least one circuit is configured to, when applying at least one adjustment of the one or more adjustments, modify one or more characteristics of the one or more positioning components.

13. The system of claim 12, wherein at least one of the one or more positioning elements is incorporated into or coupled to the audio output element.

14. The system of claim 12, further comprising an adjuster configured to generate a force for modifying at least one of the one or more characteristics of at least one of the one or more positioning components.

15. The system of claim 14, wherein the adjuster is configured to generate the force based on activities of the user.

16. The system of claim 12, wherein the one or more positioning components comprise at least one physically-adjustable component, and wherein modifying the one or more characteristics comprises making at least one physical adjustment in the at least one physically-adjustable component.

17. The system of claim 16, wherein the at least one physically-adjustable component comprises an inflation element, and wherein modifying the one or more characteristics comprises modifying inflation of the at least one inflation element to affect the contact with the user.

18. The system of claim 17, comprising an inflation adjuster that is configured to adjust the inflation of the at least one inflation element.

19. The system of claim 18, wherein the inflation adjuster is configured to modify the inflation of the at least one element by adjusting one or more both of injection of a substance into and releasing of the substance from the at least one inflation element.

20. The system of claim 9, wherein the audio output element comprises one or more of: a headphone, a headset, an in-ear headphone, and an earbud.

* * * * *